US006455808B1

(12) United States Patent
Chung et al.

(10) Patent No.: US 6,455,808 B1
(45) Date of Patent: Sep. 24, 2002

(54) PULSE POWER SYSTEM

(75) Inventors: Kie Hyung Chung, Pyongtaek; Kang Ok Lee, Seoul; Hyeok Jung Kwon, Inchon; Chul Yeong Kim, Kunpo; Kyoung Jae Chung, Seoul, all of (KR)

(73) Assignee: Korea Accelerator and Plasma Research Association, Seoul (KR)

( * ) Notice: Subject to any disclaimer, the term of this patent is extended or adjusted under 35 U.S.C. 154(b) by 0 days.

(21) Appl. No.: 09/516,919

(22) Filed: Mar. 1, 2000

(30) Foreign Application Priority Data

Mar. 2, 1999 (KR) ........................................... 99-6822
Jul. 9, 1999 (KR) ........................................... 99-27818

(51) Int. Cl.[7] ............................................... B23K 9/10
(52) U.S. Cl. ................................ 219/130.51; 315/198
(58) Field of Search ................. 315/198; 219/131–135, 219/130.01–130.51

(56) References Cited

U.S. PATENT DOCUMENTS 3,679,007 A 7/1972 O'Hara
3,696,264 A * 10/1972 Clark, Jr. et al. ........... 313/160
3,803,382 A * 4/1974 Tajbl et al. ................. 219/315
4,409,447 A 10/1983 Noeske
4,673,792 A * 6/1987 Garland et al. ............... 219/74
4,677,960 A * 7/1987 Ward .......................... 123/598
5,106,164 A 4/1992 Kitzinger et al.
5,428,267 A * 6/1995 Peil ............................ 363/132
5,465,030 A 11/1995 Smith

FOREIGN PATENT DOCUMENTS

EP 0546692 6/1993
JP 04-206400 7/1992

* cited by examiner

*Primary Examiner*—Lincoln Donovan
(74) *Attorney, Agent, or Firm*—Lee & Hong

(57) ABSTRACT

A pulse power system includes an energy storing device for storing electric energy; a high power arc switch comprising: a cylindrical housing having a central axis and defining a predetermined discharging region; a first electrode disposed within the cylindrical housing to be movable in a direction of the central axis; a second electrode disposed within the cylindrical housing and spaced away from the first electrode at a predetermined distance, an arc generating between the first and second electrodes as the first electrode approaches the second electrode; an insulating member formed at a portion between the first and second electrodes except for the discharging region; and a solenoid coil for forming a magnetic field within the discharging region in a direction of the central axis, the arc formed between the first and second electrodes being spirally moved in a direction of the central axis by a magnetic field formed in a circular direction by the arc and the magnetic field formed by the solenoid coil in the direction of the central axis, thereby electrically interconnecting the first and second electrodes; a load excited by the electric energy stored in the energy storing device according to an operation of the switch; and a transmission line for connecting the switch and the load.

11 Claims, 4 Drawing Sheets

PULSE POWER SYSTEM

This application claims the benefit of the Korean Patent Application Nos. 1999-6822 and 1999-27818, respectively, filed on Mar. 2, 1999 and on Jul. 9,1999 which are hereby incorporated by reference.

BACKGROUND OF THE INVENTION (1) Field of the Invention

The present invention relates to a pulse power system.

(2) Description of Related Arts

A pulse power system is used in storing electric energy and then releasing the energy at a single instant to generate a large amount of electric power.

FIG. 1 shows a block diagram of a conventional pulse power system.

A conventional pulse power system comprises a power supply 110 having a generator, a transformer and a rectifier, an energy storage 120 for storing charges, a switch 130 for controlling electric power, a transmission line 140, and a load 150 to which pulsed power is applied. Such a pulse power system is generally applied to a plasma blasting system and an electromagnetic welding system.

U.S. Pat. Nos. 3,158,207, 3,364,708, 3,500,942, 3,583,766, 3,679,007 and 5,106,164 disclose plasma blasting systems in which various pulse power systems are applied.

When applying a pulse power system to such a plasma blasting system, safety and durability of the switch are significant problems. That is, there is a need for a switch capable of reducing a possible damage of an electrode by high current and preventing an inadvertent operation of the switch caused by abnormally triggering of the same.

In addition, the transmission line has been made of a coaxial cable, which is considered a skin depth to reduce AC resistance.

SUMMARY OF THE INVENTION

Therefore, it is an object of the present invention to provide a pulse power system having an arc switch which is designed to have a fail-safe function to prevent an inadvertent operation of the system.

It is another object of the present invention to provide a pulse power system having a transmission line that can reduce AC resistance.

It is still another object of the present invention to provide a pulse power system having an arc switch which is simple in structure, thereby reducing manufacturing costs.

To achieve the above objects, the present invention provides a pulse power system comprising an energy storage device for storing electric energy, a high power arc switch comprising, a cylindrical housing having a central axis and defining a predetermined discharging region, a first electrode disposed within the cylindrical housing to be movable in a direction of the central axis, a second electrode disposed within the cylindrical housing and spaced away from the first electrode at a predetermined distance, the second electrode generating an arc between the first and second electrodes as the first electrode approaches the second electrode, an insulating member formed at a portion between the first and second electrodes except for the discharging region, and an electric wire coil for forming a magnetic field within the discharging region in a direction of the central axis, the arc formed between the first and second electrodes being spirally moved in a direction of the central axis by a magnetic field formed in a circular direction by the arc and the magnetic field formed by the electric wire coil in the direction of the central axis, thereby electrically interconnecting the first and second electrodes, a load member exciting the electric energy stored in the electric energy storing device according to an operation of the switch, and a transmission line for connecting the switch and the load member.

Preferably, the electric wire is made of Litz wire, and the first electrode is provided with a tip for generating an arc discharge, the tip being removable. The tip is cone-shaped, and a portion of the second electrode opposing the tip is designed to define a cone-shaped space complemental to the cone-shaped tip.

A declination of the cone-shaped tip is larger than that of the cone-shaped space.

BRIEF DESCRIPTION OF THE DRAWINGS

The accompanying drawings, which are incorporated in and constitute a part of the specification, illustrate an embodiment of the invention, and, together with the description, serve to explain the principle of the invention.

DETAILED DESCRIPTION OF THE PREFERRED EMBODIMENTS

A preferred embodiment of the present invention will now be described in detail with reference to the accompanying drawings.

Figure 1:
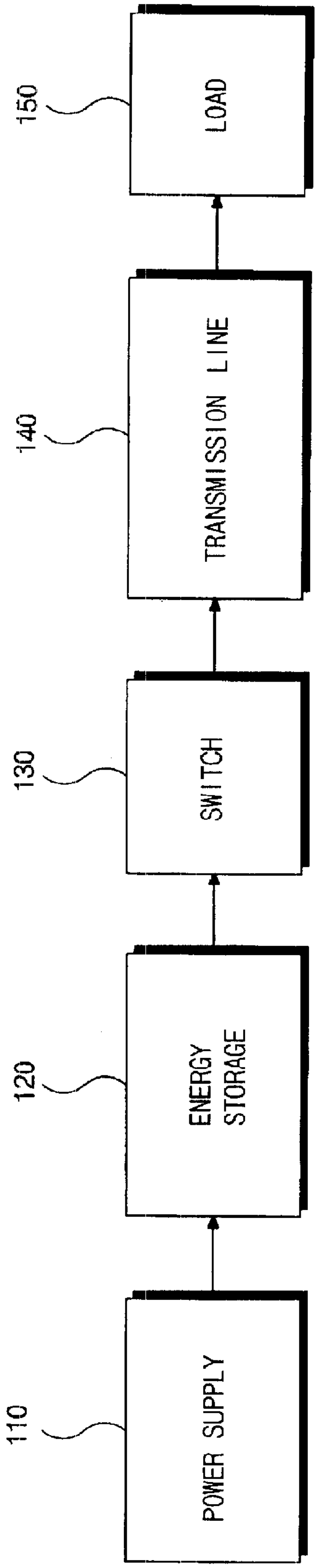
(Prior Art) FIG. 1
FIG. 1 is a block diagram illustrating a conventional pulse power system.
Figure 2:
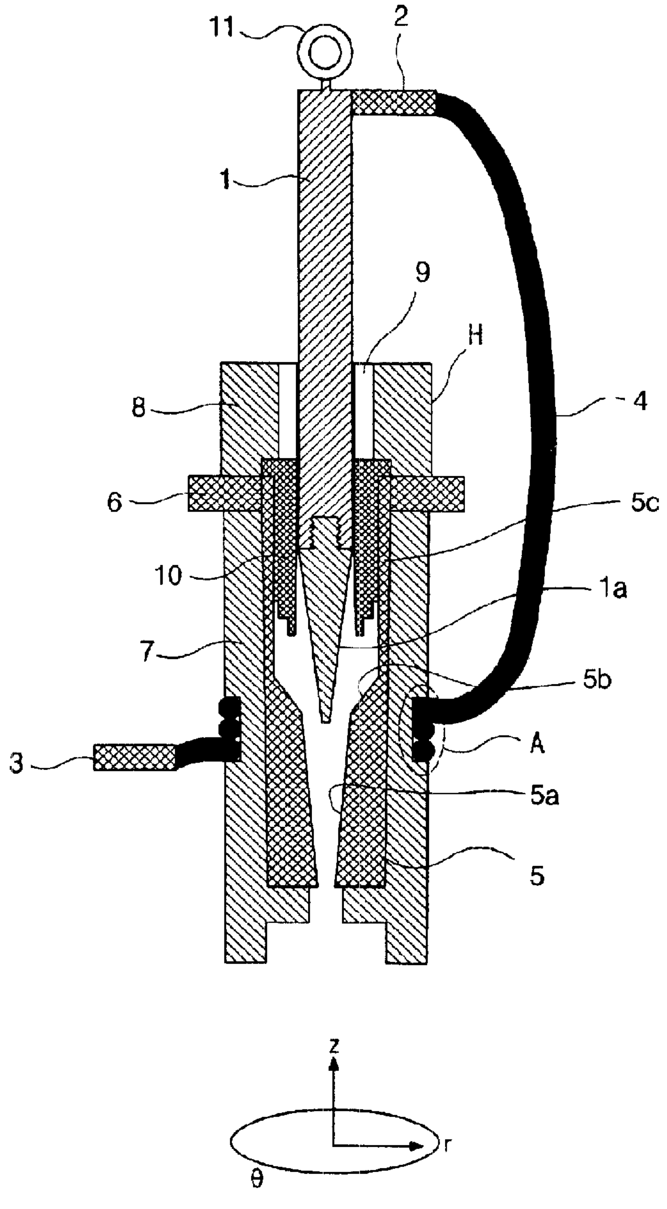
FIG. 2 is a sectional view of a switch of a pulse power system according to a first embodiment of the present invention.

FIG. 2 shows an arc switch for a pulse power system according to a first embodiment of the present invention.

As shown in the drawing, an arc switch comprises a cylindrical housing "H" having lower and upper bodies 7 and 8 which are co-axially disposed, a first electrode 1 disposed within the cylindrical housing "H" at a predetermined distance from an inner circumference of the cylindrical housing "H" and a second electrode 5 disposed on the inner circumference of the lower body 7 of the cylindrical housing "H". Coupled on a bottom of the first electrode 1 is an electrode tip 1*a* which is cone-shaped. Preferably, the electrode tip 1*a* has bolt and nut structure and is removable so that the tip I a can be easily replaced.

The first electrode 1 is connected to a first electrode connector 2 for positive voltages, while the second electrode 5 is connected to a second electrode connector 6 for negative voltages.

A solenoid coil "A" connects to the first electrode connector 2 and a power supplying connector 3 to which current flows from the power supply. And the solenoid coil "A" is coiled by predetermined turn-ratio "N" times around an outer circumference of the lower body 7 of the cylindrical housing "H" to form a magnetic field in a direction of a Z-axis.

Preferably, the solenoid coil is comprised of Litz wire to increase a surface area and to reduce a power loss, thereby effectively transmitting high power pulse.

Although the cylindrical housing "H" is separated into the lower and upper bodies 7 and 8 as a matter of convenience in assembling, it is possible to form these integrally into a single body.

Disposed between the first and second electrodes 1 and 5 is an insulator 10 to prevent the switch from operating inadvertently. The insulator 10 is located on an inner side of the housing "H" and provided with several steps to increase withstand voltages by enlarging a surface area thereof.

Formed on a top of the first electrode 1 is a ring 11 connected to an actuator (not shown) for a to-and-fro motion realized along a central axis of the cylindrical housing "H". Preferably, a linear bearing 9 is disposed between the upper body 8 of the housing "H" and the first electrode 1 so that the to-and-fro motion of the first electrode 1 can be smoothly realized.

When the tip 1*a* of the first electrode 1 and the second electrode 5 appropriately keep close to each other by moving downwardly, an arc is generated between the first and second electrodes 1 and 5. For this purpose, it is preferable that the tip 1*a* of the first electrode 1 is cone-shaped and the second electrode 5 opposing the tip 1*a* is designed to define a cone-shaped space corresponding to the cone-shape of the tip 1*a*. And a declination of the cone-shaped tip 1*a* is larger than that of the cone-shape of an inner surface 5*a* of the second electrode 5. Further, the second electrode 5 is provided with a declined upper surface 5*b* extending from the cone-shaped inner surface 5*a* of the second electrode 5 to the cylindrical surface 5*c* to prevent the steep declination that can occur between the surfaces 5*a* and 5*c*.

Figure 3:
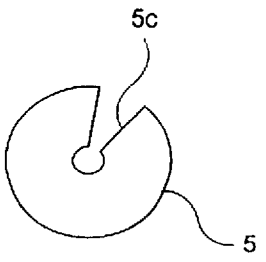
FIG. 3 is a bottom view of a second electrode of a switch depicted in FIG. 2.

As shown in FIG. 3 showing a bottom view of the second electrode 5, the second electrode 5 is further provided with a radial cut-away portion 5*c* to prevent an inductive current from obstructing the magnetic field between the first and second electrodes 1 and 5.

Figure 4:
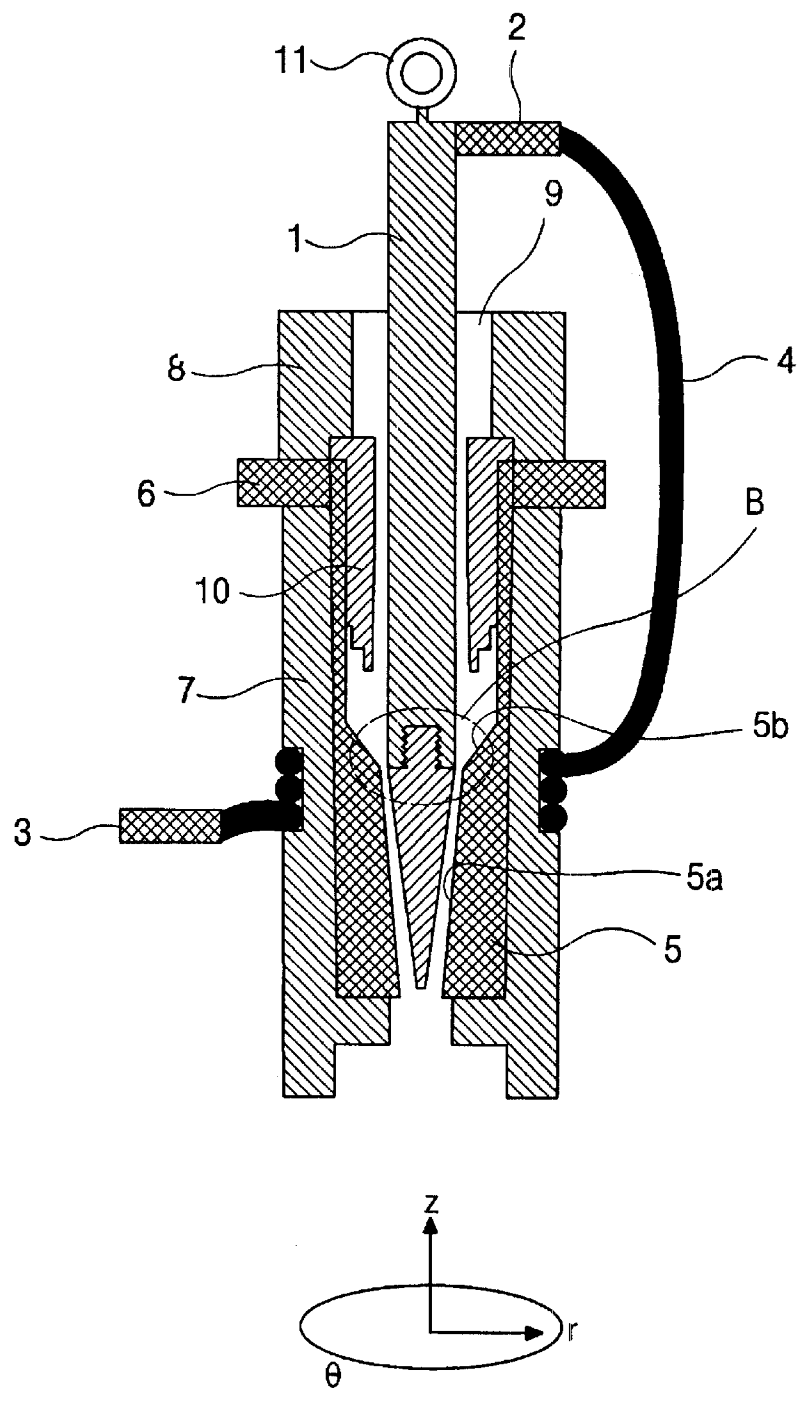
FIG. 4 is a sectional view illustrating a discharging state caused by a displacement of a first electrode of a switch depicted in FIG. 2.

FIG. 4 shows a section view illustrating an arc discharging state when the cone-shaped tip 1*a* of the first electrode 1 keeps close to the cone-shaped inner surface 5*a* of the second electrode 5.

When the cone-shaped tip 1*a* keeps close to the cone-shaped inner surface 5*a,* the closest portion between them is formed at a top end of the cone-shaped inner surface 5*a,* whereas the farthest portion is formed at a bottom as the declination of the con-shaped tip 1*a* is larger than that of the cone-shaped inner surface 5*a*.

The closest portion becomes an initial discharging region "B" where the arc-discharge occurs. The arc discharge generates a magnetic field in a circumference direction "θ" of the first electrode 1.

Thus, the arc discharge is directed by the magnetic fields in the axis direction "−Z" and the circumference direction "θ" by Lorenz force. That is, the arc spirally moves downward along a space between the cone-shaped tip 1*a* of the first electrode 1 and the cone-shaped inner surface 5*a* of the second electrode 5 in the axis direction "−Z". If required, a hole penetrating both the second electrode 5 and the housing "H" may be formed to reduce a pressure load caused by the arc.

As described above, since the electrodes are not discharged locally when the arc is spirally moved, a damage of the electrode is prevented, thereby improving the durability of the switch.

In addition, since the arc is moved away from the insulating member 10, the damage of the insulating member 10 can be prevented. And also coating of conductive material to the insulating member 10 from the first electrode 1 is drastically reduced. Accordingly, the possibility of a pre-trigger or an inadvertent trigger is reduced, improving the safety and reliability of the switch.

By varying the turn-ratio "N" times, the intensity of the magnet field can be optimized to best suit a pulse system.

Figure 5:
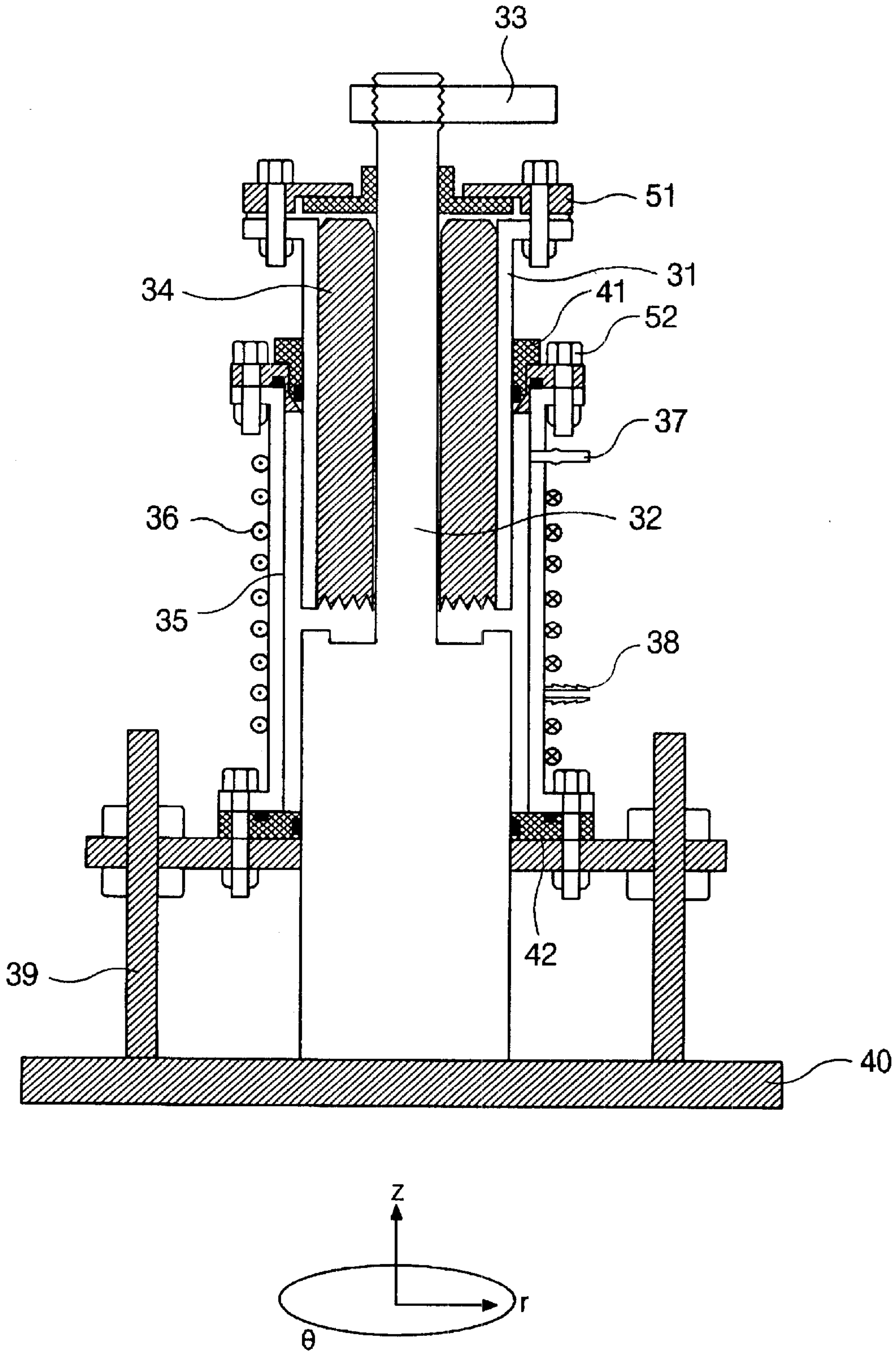
FIG. 5 is a sectional view of a switch according to another embodiment of the present invention.

FIG. 5 shows an arc switch according to another embodiment of the present invention.

As shown in the drawing, an arc switch comprises a cylindrical first electrode 31, a grounded electrode 32 disposed along a central axis of the cylindrical first electrode 31 and extending downward, a second electrode 35 disposed around and spaced away from the first and grounded electrodes 31 and 32, a solenoid coil 36 for generating a magnetic field in a direction of the central axis "−Z", insulating members 41 and 42 for air-tightly closing a space between the first electrode 31, the grounded electrode 32 and the second electrode 35, a vacuum port 38 connected to a vacuum device (not shown) to realize a vacuum in the closed space, and a trigger pin 37 for generating high voltages between the first and second electrodes 31 and 35, thereby electrically connecting them. Disposed between the first electrode 31 and the grounded electrode 32 is an insulating member 34.

Reference numeral 33 indicates a grounded connector. Reference numerals 51 and 52 indicate portions which are respectively connected to a charging power supply and a load part. Reference numerals 39 and 40 indicate a switch insulating member and a switching die, respectively.

The operation of the above-described switch will be described hereinafter.

When high voltages are generated between the first and second electrodes 31 and 35 by operating the trigger pin 37, electrons are locally induced, thereby electrically interconnecting the first and second electrodes 31 and 35 while generating an arc.

In addition, by magnetic fields induced in the axis direction "Z" by the solenoid coil 36 and in the circumference direction by the arc, the arc moves downward to allow the discharge to widely occur, preventing the electrodes from being locally damaged.

The downward movement of the arc is transmitted to the grounded electrode 32 so that the grounded electrode 32 performs a "crowbaring" action.

In a conventional art, the "crowbaring" action is performed by an additional device such as a storage battery for adjusting a wave of current so as to prevent a life span of the switch from being shortened by backward voltages. For example, if a diode for the "crowbaring" action is used, the high power switch like the inventive switch requires a large number of high-cost diodes.

However, in the present invention, since the "crowbaring" action can be realized without using an additional device, manufacturing costs can be reduced. In addition, by adjusting a distance between the first electrode 31 and the grounded electrode 32, a duration of the "crowbaring" action can be adjusted in accordance with a condition where the switch is used.

In addition, by adjusting a degree of vacuum of the space among the first and second electrodes 31 and 35 and the grounded electrode 32, withstand voltage can be properly adjusted in accordance with a system where the switch is applied.

The above switch is connected to a probe (not shown) by a transmission line. Preferably, the transmission line is comprised of a coaxial cable to reduce inductance of the system, thereby effectively transmitting high pulse power. Particularly, when a Litz wire is used as the coaxial cable, AC resistance can be also reduced.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A pulse power system comprising:

an energy storage device for storing electric energy;

a high power arc switch for controlling discharge of stored electric energy of the storage device, including, a cylindrical housing having a central axis and defining a predetermined discharging region, a first electrode disposed within the cylindrical housing to move along the direction of the central axis of the cylindrical housing, a second electrode disposed within the cylindrical housing and spaced away from the first electrode at a predetermined distance, an arc generated between the first and second electrodes as a result of the first electrode approaching the second electrode, an insulating member formed at a portion between the first and second electrodes except for the discharging region, and a solenoid coil for forming a magnetic field within the discharging region in a direction of the central axis, the arc formed between the first and second electrodes being spirally moved in a direction of the central axis by a magnetic field formed in a circular direction by the arc and the magnetic field formed by the solenoid coil in the direction of the central axis, thereby electrically interconnecting the first and second electrodes;

a load excited by the electric energy stored in the energy storing device according to an operation of the switch; and a transmission line for connecting the switch and the load.

2. The pulse power system of claim 1, wherein the solenoid coil is comprised of Litz wire.

3. The pulse power system of claim 1, wherein the first electrode is provided with a removable tip for generating an arc discharge.

4. The pulse power system of claim 3, wherein the tip is cone-shaped, and the second electrode opposing is designed to define a cone-shaped space corresponding to the cone-shaped tip.

5. The pulse power system of claim 4, wherein a declination of the cone-shaped tip is larger than that of the second electrode.

6. A pulse power system comprising:

an energy storing part for storing electric energy;

a switch for controlling output of the electric energy stored in the energy storing part;

a load excited by the electric energy in a short time in accordance with an operation of the switch; and a Litz wire for connecting the switch and the load.

7. A pulse power system comprising:

an energy storage device for storing electric energy;

a high power arc switch for controlling discharge of stored electric energy of the storage device, including, a first electrode being elongated in a direction and having first and second ends, the first end being connected to a first connector;

a second electrode spaced apart from and surrounding the first electrode, elongated in the direction and having third and fourth ends correspondingly defined to the second and first ends, respectively, the fourth end being connected to a second connector where an opposite voltage to that of the first connector is applied;

a discharging region defined between the first and second ends and between the first and second electrodes;

a solenoid coil spaced apart from and surrounding the second electrode at a position corresponding to the discharging region and forming a magnetic field in the direction of elongation of the first electrode;

wherein an arc that is generated in the discharging region electrically interconnects the first and second electrodes and spirally moves to the second and third ends by two magnetic fields formed by the solenoid coil and by a current generated from the interconnection between the first and second electrodes;

a load excited by the electric energy stored in the energy storing device according to an operation of the switch; and a transmission line for connecting the switch and the load.

8. The pulse power system of claim 7, wherein the first and second electrodes are configured such that a distance therebetween at the discharging region is shorter than that at any other region when the first electrode moves in the elongated direction; thereby generating the arc at the discharging region.

9. The pulse power system of claim 8, wherein the second end is cone shaped, a corresponding portion of the second electrode surrounds the second end, and a declination of the cone shaped second end is larger than that of the corresponding portion.

10. The pulse power of system claim 7, further comprising a trigger for generating the arc at the discharge region.

11. The pulse power system of claim 7, wherein the solenoid coil is comprised of Litz wire.

* * * * *